US010699128B2

(12) United States Patent
Stern et al.

(10) Patent No.: US 10,699,128 B2
(45) Date of Patent: Jun. 30, 2020

(54) METHOD AND SYSTEM FOR COMPARING CONTENT

(71) Applicant: Cisco Technology, Inc., San Jose, CA (US)

(72) Inventors: Amitay Stern, Jerusalem (IL); Yoav Glazner, Beit Shemesh (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 69 days.

(21) Appl. No.: 15/271,250

(22) Filed: Sep. 21, 2016

(65) Prior Publication Data

US 2018/0082121 A1 Mar. 22, 2018

(51) Int. Cl.
*G06K 9/00* (2006.01)

(52) U.S. Cl.
CPC ..... *G06K 9/00744* (2013.01); *G06K 9/00758* (2013.01)

(58) Field of Classification Search
None
See application file for complete search history.

(56) References Cited

U.S. PATENT DOCUMENTS

| 6,473,095 | B1 | 10/2002 | Martino et al. | |
|---|---|---|---|---|
| 8,347,408 | B2 | 1/2013 | Rodriguez | |
| 2003/0174859 | A1* | 9/2003 | Kim | G06F 17/30256 382/100 |
| 2008/0229357 | A1 | 9/2008 | Candelore et al. | |
| 2009/0154806 | A1* | 6/2009 | Chang | G06F 17/30781 382/173 |
| 2009/0175538 | A1 | 7/2009 | Bronstein et al. | |
| 2009/0327334 | A1* | 12/2009 | Rodriguez | G06F 17/3079 |
| 2009/0328125 | A1* | 12/2009 | Gits | G06F 17/3079 725/118 |
| 2009/0328237 | A1* | 12/2009 | Rodriguez | G06F 17/30781 726/32 |

(Continued)

FOREIGN PATENT DOCUMENTS

WO 2013/104432 7/2013

OTHER PUBLICATIONS

Douze, Matthijs et al.; An Image-Based Approach to Video Copy Detection With Spatio-temporal Post-Filtering, IEEE Transactions on Multimedia, vol. 12 No. 4, Jun. 2010.

(Continued)

*Primary Examiner* — Justin P. Misleh
(74) *Attorney, Agent, or Firm* — Merchant & Gould P.C.

(57) ABSTRACT

Methods and systems for comparing content are provided. A recognizable object which appears in frames of a reference video file is recognized. A meta-feature of the recognizable object is determined. A first vector indicative of the meta-feature of the identified recognizable object in the reference video file is created. The meta-feature of the identified recognizable object which appears in a suspect video file is determined. A second vector indicative of the meta-feature of the identified recognizable object in the suspect video file is created. A correlation between the first vector and the second vector is determined. The correlation between the first vector and the second vector is indicative of a degree of confidence that the suspect video file is a copy of the reference video file.

20 Claims, 9 Drawing Sheets

(56) References Cited

U.S. PATENT DOCUMENTS

| | | | |
|---|---|---|---|
| 2010/0104259 A1* | 4/2010 | Shakya | H04N 5/913 386/252 |
| 2011/0037852 A1 | 2/2011 | Ebling et al. | |
| 2011/0113444 A1* | 5/2011 | Popovich | G06F 17/3079 725/32 |
| 2013/0039587 A1* | 2/2013 | Zhang | G06K 9/00711 382/201 |
| 2015/0134668 A1* | 5/2015 | Popovich | G06F 17/3082 707/741 |
| 2016/0048887 A1* | 2/2016 | Joshi | G06Q 30/0271 705/14.67 |
| 2016/0072599 A1* | 3/2016 | Kariyappa | G06F 17/30743 700/94 |
| 2017/0228599 A1* | 8/2017 | De Juan | G06K 9/00744 |
| 2017/0357875 A1* | 12/2017 | Hardee | G06K 9/6201 |

OTHER PUBLICATIONS

Wu, Chenxia et al.; A Content-Based Video Copy Detection Method With Randomly Projected Binary Features (2012).

* cited by examiner

METHOD AND SYSTEM FOR COMPARING CONTENT

TECHNICAL FIELD

The present disclosure generally relates to comparing versions of content files to determine if they are the same content item.

BACKGROUND

Copyright holders seek to identify copyright violations which occur when copyrighted content, such as a copyrighted video, is pirated. Such content, to which access has been made available in violation of copyright, may be referred to as hacked video, hacked content, rogue content, pirated content, or other similar terms.

It is often the case that pirated content will be manipulated by pirates in an attempt to frustrate automatic detection systems, so that automatic detection via simple comparison becomes difficult. Such manipulations may include, for example, but not be limited to: change of color, cropping, rotation/translation, audio mute/swap, video format transcoding, etc.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

In one embodiment, a system, apparatus and method are described, the system having at least one storage device for storing a reference video file including a plurality of frames in which an identifiable recognizable object appears, a suspect video file including a plurality of frames in which the identifiable recognizable object appears, a computer including a processor to determine, on a per frame basis, at least one meta-feature of the identifiable recognizable object which appears in each frame of the reference video file, create a first vector for the reference video file, the first vector being a vector of the determined at least one meta-feature of the identifiable recognizable object which appears in each frame of the reference video file, determine, on a per frame basis, the at least one meta-feature of the identifiable recognizable object which appears in each frame of the suspect video file, create a second vector for the suspect video file, the second vector being a vector of the determined at least one meta-feature of the identifiable recognizable object which appears in each frame of the suspect video file, and calculate a correlation between the first vector and the second vector and thereupon apply a statistical method to determine a measure of the correlation between the first vector and the second vector, a result of the statistical method being indicative of a degree of confidence, and an interface for the processor to output a result on the basis of the degree of confidence, the result indicative of a degree of certainty that the suspect video file is a copy of the reference video file. Related systems, apparatus and methods are also described.

Example Embodiment

Figure 1:
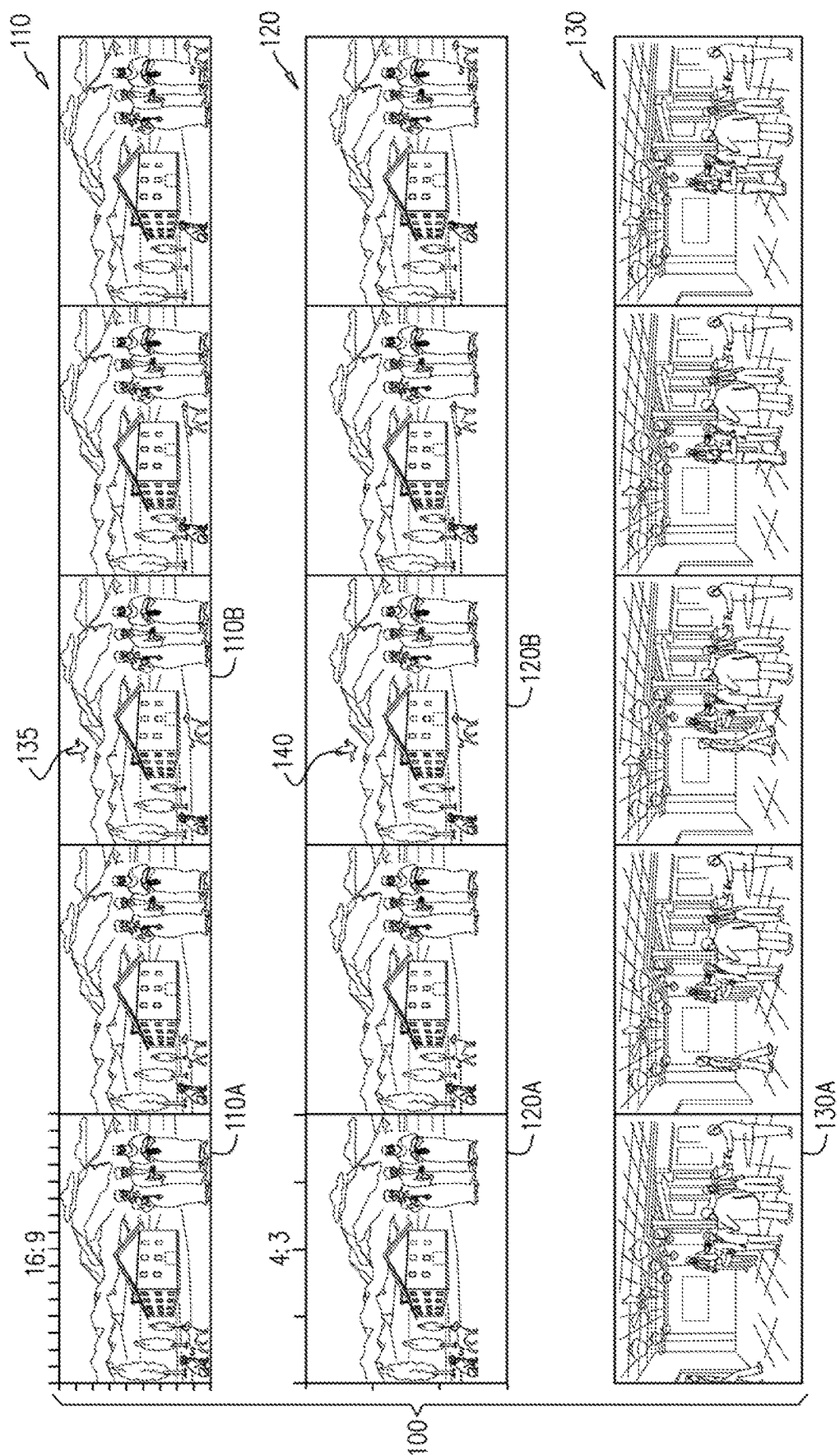
FIG. 1 is a simplified pictorial illustration of three series of five video frames for analysis by a system for content comparison constructed and operative in accordance with an embodiment of the present invention.

Reference is now made to FIG. 1, which is a simplified pictorial illustration of three series of five video frames 100 for analysis by a system for content comparison constructed and operative in accordance with an embodiment of the present invention. A first row of five video frames 110 comes from an exemplary reference video file. A second row of five video frames 120 comes from a first exemplary suspect video file. A third row of five video frames 130 comes from a second exemplary suspect video file. It is noted that the first exemplary suspect video file matches the exemplary reference video file, while the second exemplary suspect video file does not match the exemplary reference video file. It is also noted that the exemplary reference video file has a 16:9 aspect ratio while the first exemplary suspect video file has a 4:3 aspect ratio.

Figure 2:
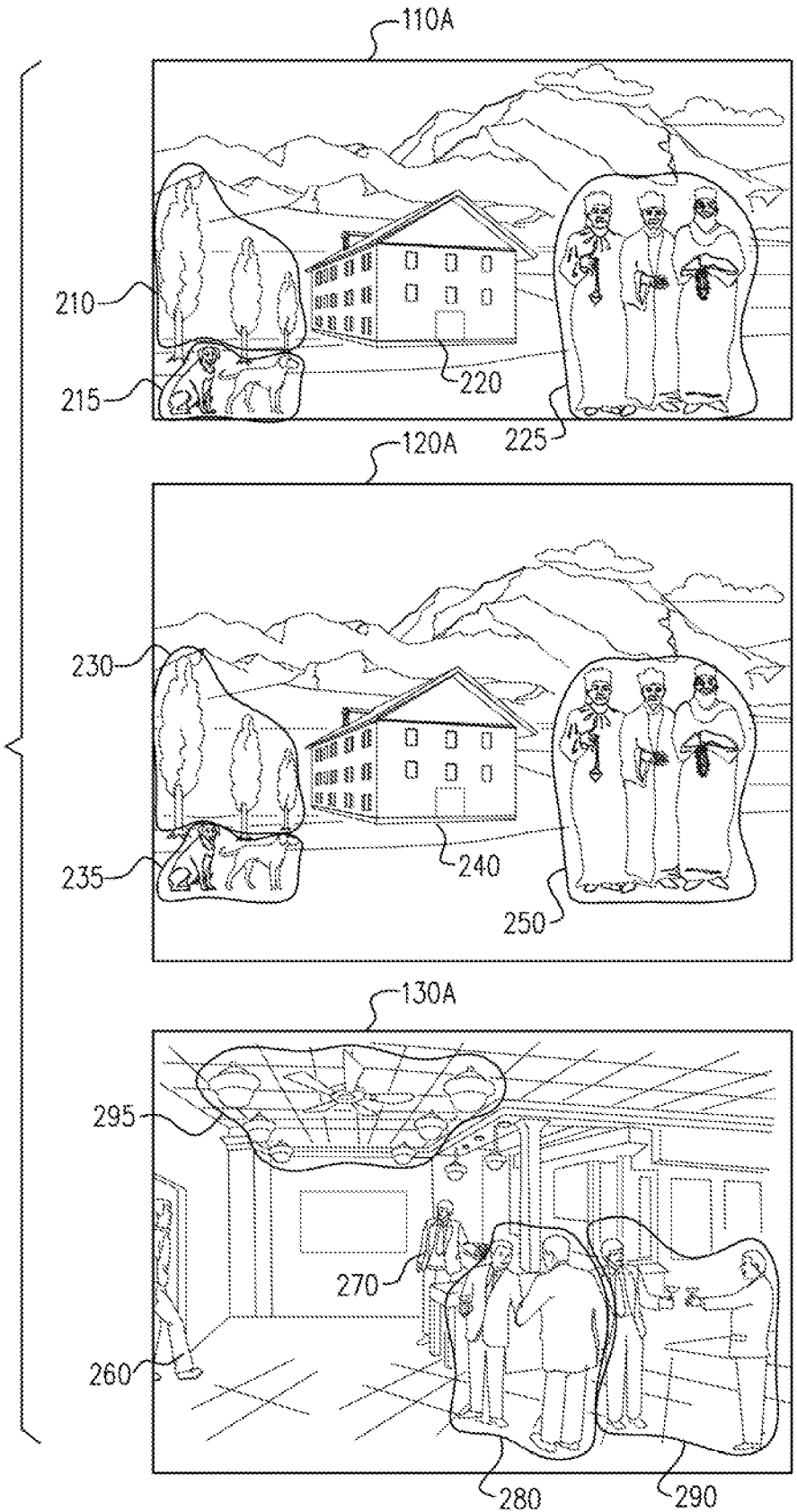
FIG. 2 is a simplified pictorial illustration of a blown-up version of a single frame from each one of the three series of five video frames of FIG. 1.

Reference is now made to FIG. 2, which is a simplified pictorial illustration of a blown-up version of a single frame 110A, 120A, 130A from each one of the three series of five video frames 100 of FIG. 1. Frame 110A, the first frame of the first row of five video frames 110 shows various recognizable objects in each video frame. By way of example, there are a number of trees 210, some dogs 215, a building 220, and a group of people 225. Similarly, frame 120A, the first frame of the second row of five video frames 120 shows various recognizable objects in each video frame. As in frame 110A, frame 120A shows a number of trees 230, some dogs 235, a building 240, and a group of people 250. Frame 130A, the first frame of the third row of five video frames 130 also shows various recognizable objects in each video frame. Frame 130A shows a first person 260, who appears to be entering the frame 130A from the left side, a person 270 in the background of the frame 130A, and a first group of two people 280, depicted as shaking hands, and a second group of two people 290, who are depicted as raising their glasses in a toast. Frame 130A also shows various other easily identified recognizable objects (which may also be referred to herein below simply as "recognizable objects"), such as various lighting fixtures and ceiling fans 295.

Other easily identified recognizable objects may appear in the various video frames in an incidental fashion, or simply as background. For example, a window is seen in the frames of the second exemplary suspect video file, and mountains appear in the exemplary reference video file and the first exemplary suspect video file. However, because background items may appear only in a limited number of particular scenes in an entire video file, background objects may not serve as useful recognizable objects for some embodiments, as described herein below. That is to say, although those objects might be easily identified recognizable objects, because of their sparsity in the entire video file, they might not be useful for embodiments described herein. By way of example, eight minutes out of a 95 minute movie may have background mountains. In such a case, mountains are not a useful easily identified recognizable object. Similarly, a bird 135, 140 appears to have been captured in an incidental fashion in frames 110B, 120B. However, because the bird's appearance in the video is incidental, the birds may not serve as a useful easily identifiable recognizable object for the purpose of content comparison, as described herein.

In general, it is appreciated that different movies and other content items may have different features which are both frequent and significant. Thus, different features should be chosen for different content. The features selection may be based on genre, for example.

At least one reason why content is valued by humans is that humans can understand and enjoy said content. However, because content is valued by humans, attempts to gain unauthorized or illegal access to the content items may be made by a hacker or pirate. Content, such as video to which the hacker or pirate has gained unauthorized or illegal access may be referred to as hacked video, hacked content, pirated video, pirated content, rogue content, or other similar terms. Persons or organizations which have gained unauthorized or illegal access to pirated content may be referred to as "pirates" or "hackers". Pirates can manipulate the video to prevent detection, but they don't want to manipulate it in a way that makes it hard to enjoy.

By way of a non-limiting example, pirates may use a website or other part of a rogue content distribution network to share a video of a football game. In an attempt to frustrate efforts at detection, the pirates may crop out part of the frame and change the brightness a little, or otherwise modify the video, as is known in the art. For example, as was noted above, the aspect ratio of the exemplary reference video file is 16:9. The aspect ratio of the first exemplary suspect video file is 4:3. If, for the sake of example the first exemplary suspect video file is a pirated version of the exemplary reference video file, then it may be the case that, in order to introduce a change which may help disguise the origin of the first exemplary suspect video, pirates may have changed the aspect ratio from 16:9 to 4:3 prior to releasing the first exemplary suspect video to a content sharing network.

On the other hand, pirates do not want to change crucial properties of the game: they typically will not crop out or erase the ball, the score board, the player's faces, etc. By doing so, the pirates might harm the viewing experience, and, in the extreme case, render the video unwatchable. That is to say, any modification of the video by pirates which renders the recognizable objects unrecognizable will ruin the value of the content item.

Accordingly, content may be compared between the reference video file and the suspect video file by comparing elements appearing in the video which humans need to recognize in order to enjoy the content. It is repeated for emphasis here that in FIG. 1, the first row of five video frames 110 comes from the exemplary reference video file. The second row of five video frames 120 comes from the first exemplary suspect video file. A third row of five video frames 130 comes from the second exemplary suspect video file. It is also noted that to the casual observer, it is typically clear that the second row of five video frames 120 coming from the first exemplary suspect video file is a modified duplication of the first row of five video frames 110 comes from the exemplary reference video file. Similarly, it is typically clear that the third row of five video frames 130 coming from the second exemplary suspect video file is a not at all a modified duplication of the first row of five video frames 110 coming from the exemplary reference video file.

Figure 3A:
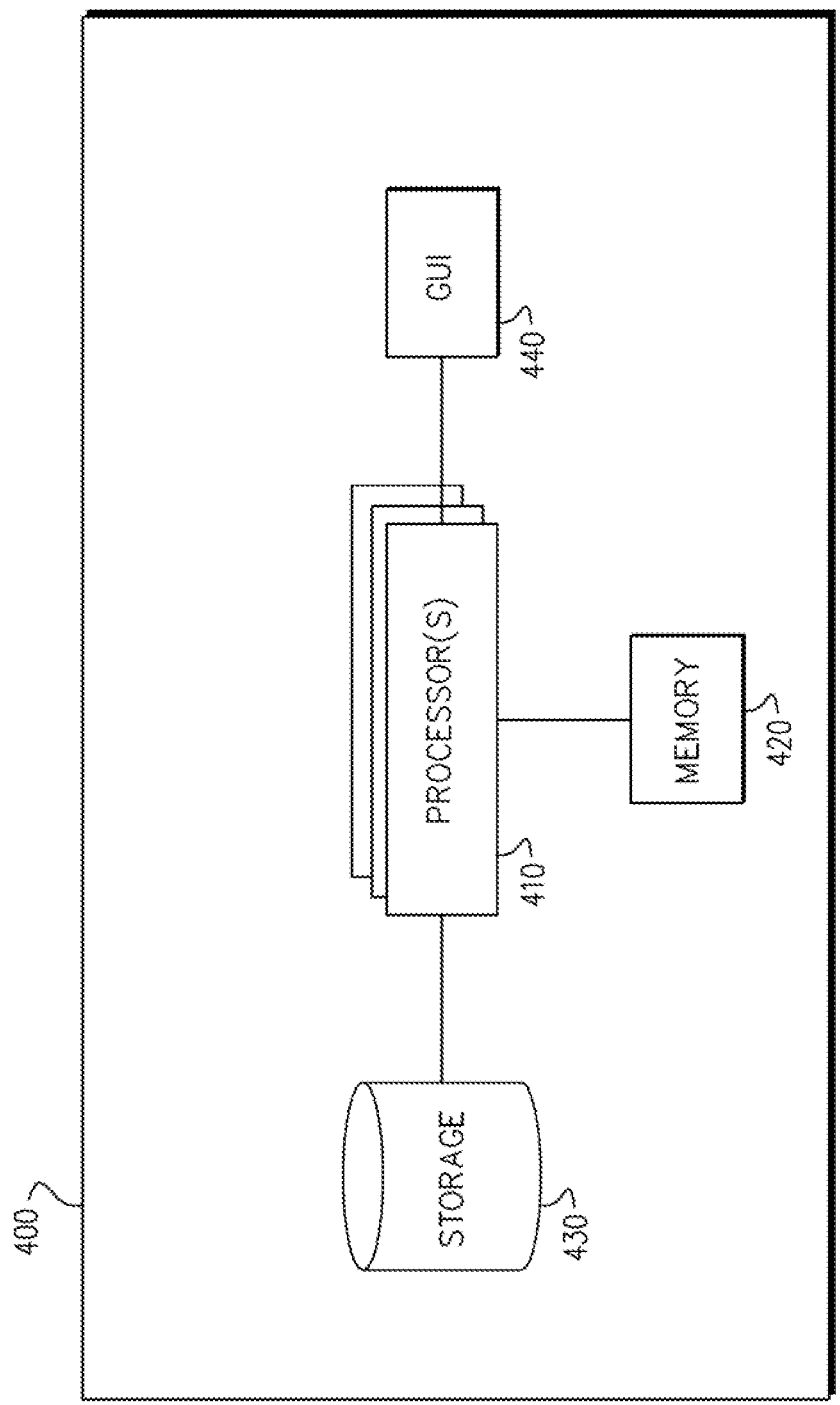
FIG. 3A is a simplified block diagram of a device for performing the method of FIG. 1.

Reference is now made to FIG. 3A, which is a simplified block diagram of a device 400 for performing the method of FIG. 1. The device 400 of FIG. 3A is typically a computing device. The device 400 typically comprises at least one processor 410, and may comprise more than one processor 410 operative to perform the steps of FIG. 3B, described below. One such processor 410 may comprise a dedicated hardware processor operative to performing the method described herein. The device 400 typically will comprise non-transitory computer-readable storage media (i.e. memory) 420. The memory 420 may store instructions, which at least one of the processors 410 may execute, in order to perform the method of comparing content, as described herein.

In addition, the computing device typically comprises long term storage 430, comprising at least one storage device such as a hard (or floppy) disk drive, a flash memory device, or other appropriate storage devices, which may be used for storing the reference and suspect video files during the execution of the steps for FIG. 3B, described below. The device 400 also comprises typical and standard hardware and software components as are known in the art. A user may interact with the device 400 via a graphical user interface (GUI) 440 or other appropriate interface, such as are known in the art.

The device 400 may be operated by a copyright owner of the reference video file; by a broadcaster; by a law enforcement agency; or any other appropriate stakeholder.

Figure 3B:
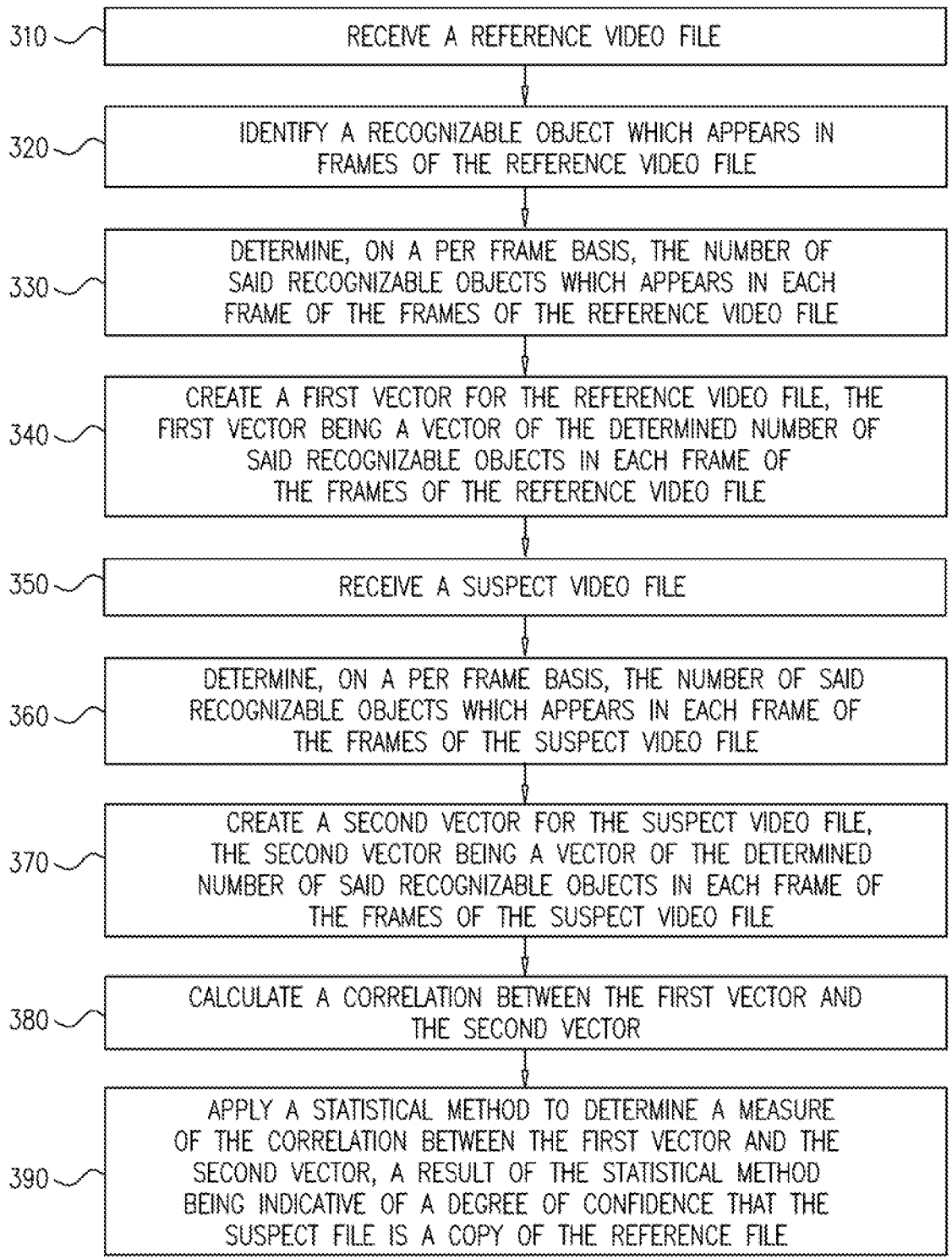
FIG. 3B is a simplified flowchart diagram of a method for content comparison used by the system of FIG. 1.

Reference is now made to FIG. 3B, which is a simplified flowchart diagram of a method for content comparison used by the system for content comparison of FIG. 1. In step 310, a reference video file, such as the source file of the first row of five video frames 110 of FIG. 1, is received. An easily identified recognizable object which appears in the frames of the reference video file is identified (step 320). By way of example, in FIG. 2, the trees of the number of trees 210, the dogs 215, buildings, such as building 220, or people (or faces, or arms, or legs) such as the group of people 225 may be identified as the easily identified recognizable object which appears in the frames of the reference video file.

On a per-frame basis, the number of said recognizable objects which appears in each frame of the frames of the reference video file is determined (step 330). For example, in frame 110A (FIG. 2) there appear three trees in the number of trees 210; two dogs among the dogs 215; one building (i.e., building 220), and three people (having three faces, showing four arms, etc.), among the group of people 225. If, by way of example "faces" is chosen as the recognizable object, then in each of the frames of the first row of five video frames 110, referring briefly to FIG. 1, it can be seen that three faces appear in each frame of the five frames.

A first vector for the reference video file is created, the first vector being a vector of the determined number of said recognizable objects in each frame of the frames of the reference video file (step 340). Accordingly, the vector for the faces in each of the frames of the first row of five video frames 110 would be 3,3,3,3,3. By contrast, if birds were selected as the recognizable object, then, the vector would be 0,0,1,0,0. As noted above, a single bird 135 (FIG. 1) appears in the middle frame of the frames of the first row of five video frames 110. However, because the bird 135 only appears in one frame 110B of the first row of five video frames 110, the bird 135 would appear to have been captured in the video by chance, and, as such, would be a less than optimal recognizable object for the analysis and comparison of content items.

In step 350 a suspect video file is received. In step 360, similar to step 320, on a per frame basis, the number of said recognizable objects which appears in each frame of the frames of the suspect video file is determined. A second vector for the suspect video file is created in step 370, the second vector being a vector of the determined number of said recognizable objects in each frame of the frames of the suspect video file. Step 370 is similar to step 330.

It is appreciated that the steps of FIG. 3B are not necessarily in chronological order. By way of example, the suspect video file may be obtained, the number of recognizable objects appearing in each frame of the frames of the suspect video file and the vector may be created (i.e. steps 350, 360, and 370) may be executed prior to steps 310, 330, and 340. It is appreciated if steps 350, 360 and 370 are executed prior to steps 310, 330, and 340 that step 320 would be executed prior to step 360.

In step 380, a correlation between the first vector and the second vector is calculated. A statistical method to determine a measure of the correlation between the first vector and the second vector is applied (step 390), where a result of the statistical method is indicative of a degree of confidence that the suspect video file is a copy of the reference video file.

Figure 4:
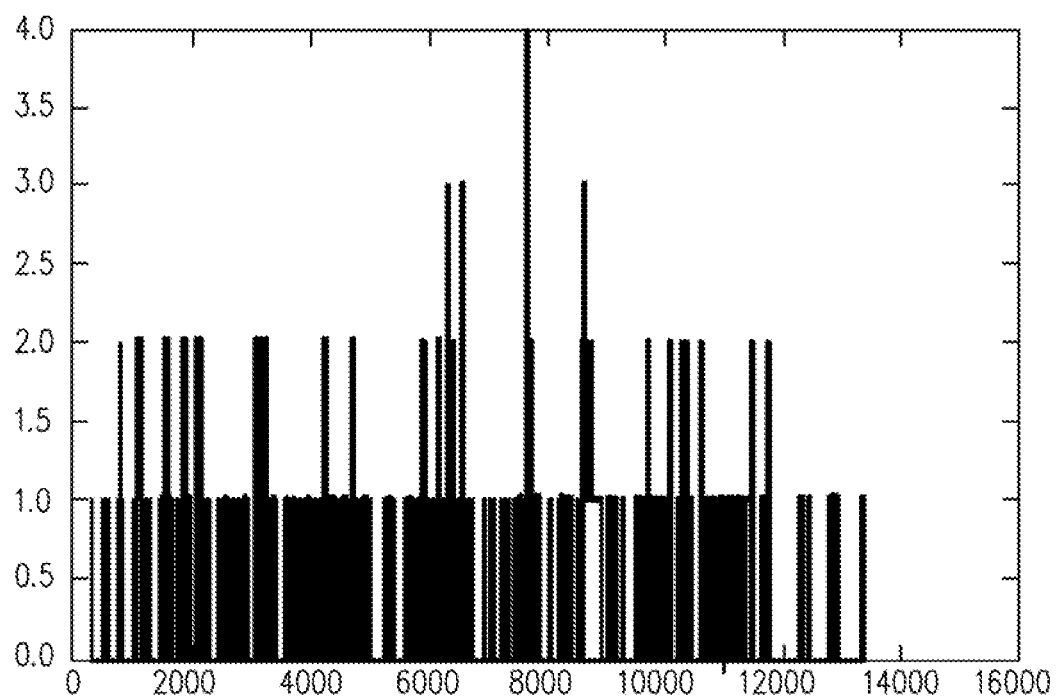
FIG. 4 is a histogram of the vector for a first reference video file.

The inventors have provided several examples of use of the present systems and method as a proof of concept. In a first example, a number of faces in each frame is used as the recognizable object. Reference is now made to FIG. 4, which is a histogram of the vector for a first reference video file. The x-axis of the graph shows frame number. The y-axis of the graph shows the number of faces per frame. It is appreciated that the first reference video file used to generate the histogram of FIG. 4 may comprise a copyrighted video.

Figure 5:
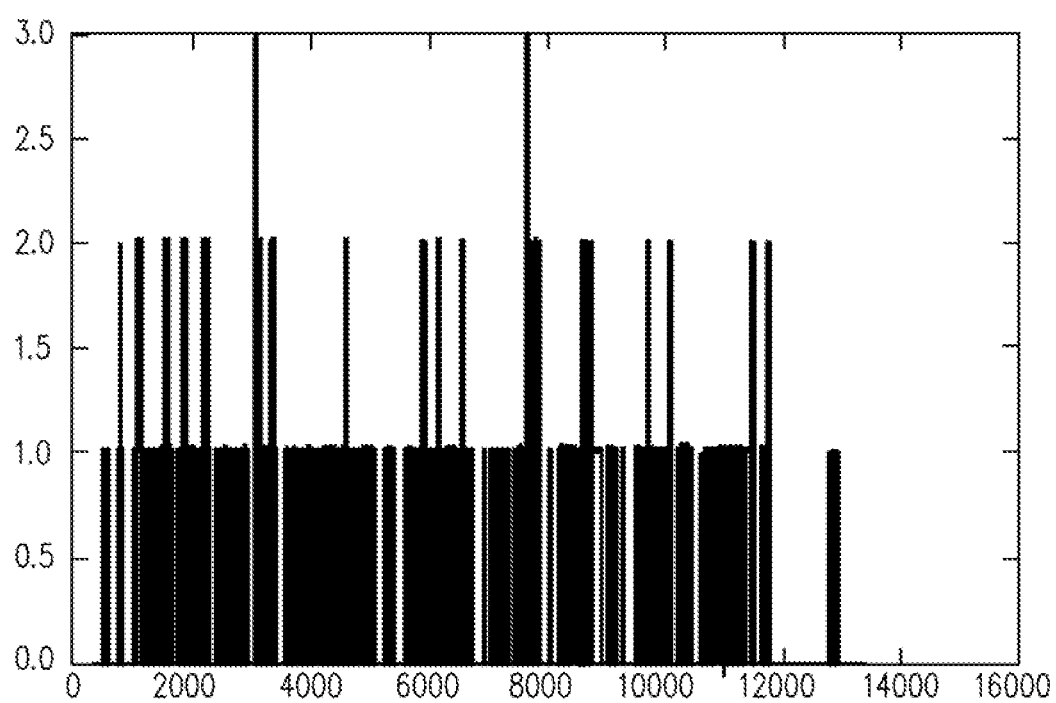
FIG. 5 is a histogram of the vector of a pirated copy (i.e. suspect video file) of the first reference video file.

By contrast, reference is now made to FIG. 5, which is a histogram of the vector of a pirated copy (i.e. first suspect video file) of the first reference video file. The pirated copy of the first reference video file used to generate FIG. 5 is a cropped copy of the first reference video file. Reference is additionally now made to FIG. 6, which is a histogram of the vector of a video file which is not related to the first reference video file.

Figure 6:
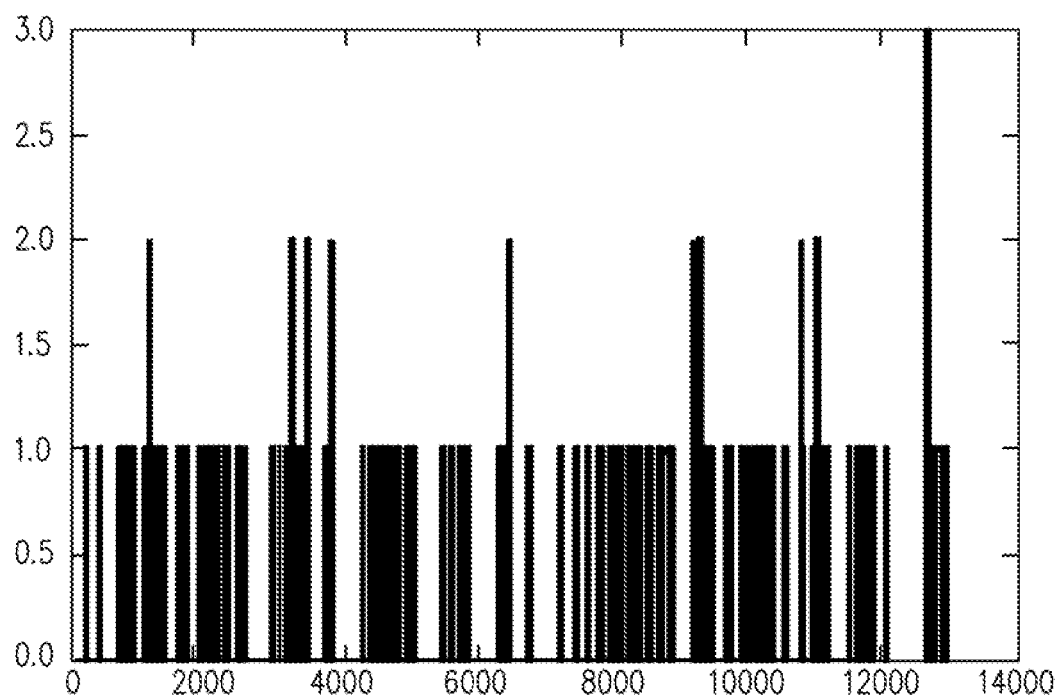
FIG. 6 is a histogram of the vector of a video file which is not related to the first reference video file.

A statistical method is applied to determine the correlation between the vectors/histograms of FIGS. 4, 5 and 6. By way of example Pearson coefficients may be determined for the vectors/histograms of FIGS. 4, 5 and 6. As is known in the art, Pearson coefficients are a measure of the correlation between two variables giving a value between −1 and 1, where 1 indicates a total positive correlation, 0 indicates no correlation, and −1 indicates a total negative correlation.

The results which are graphically displayed in FIGS. 4, 5, and 6 have the following Pearson coefficients. For the first reference video file (i.e. the results displayed in FIG. 4) versus the cropped, pirated copy of the first reference video file (i.e. the results displayed in FIG. 5), the Pearson coefficient is 0.66168393281104043. By contrast, the Pearson coefficient resulting from a comparison of the first reference video file (i.e. the results displayed in FIG. 4) with the unrelated video file (i.e. the results displayed in FIG. 6) is 0.11813618113119605.

As 0 denotes uncorrelated data and 1 denotes full positive correlation, the cropped copy of the first reference video file shows a high correlation with the reference video file. By contrast, the unrelated video file has a Pearson coefficient closer to 0, and therefore has a lower correlation.

Figure 7:
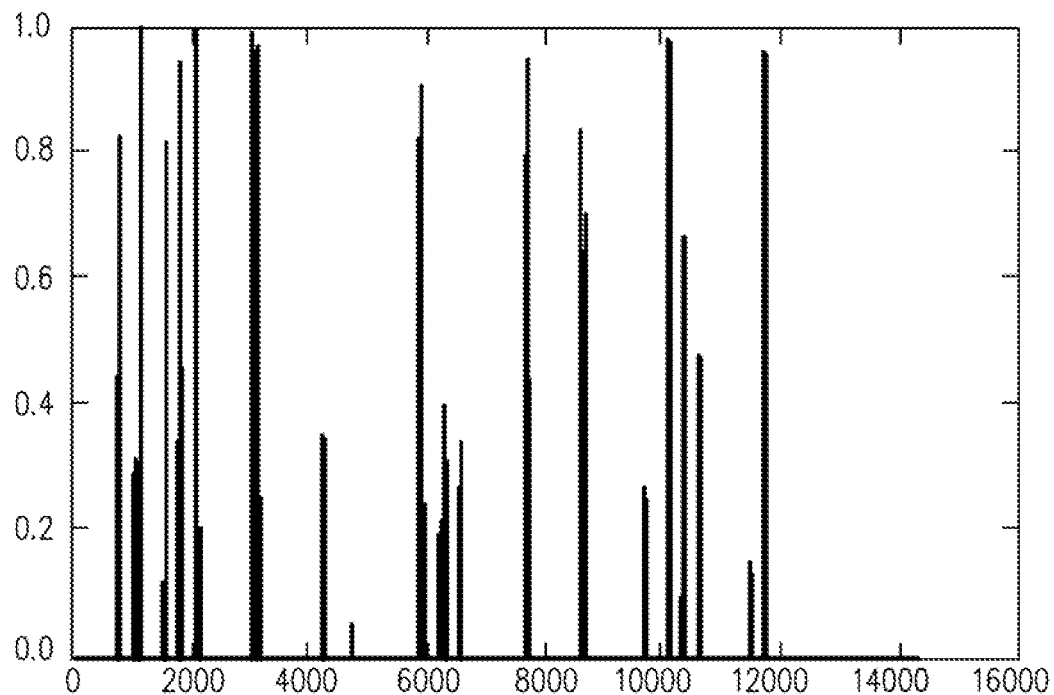
FIG. 7 is a histogram of the vector for a second reference video file.

Reference is now made to FIG. 7, which is a histogram of the vector for a second reference video file. In the second example, a derivative property of the faces was used as a basis of comparison. Specifically, a size ratio between the biggest and the smallest faces in each frame was compared between the suspect video file and the reference video file. The x-axis of the graph shows frame number. The y-axis of the graph shows the size ratio between the biggest and the smallest faces in each frame. It is appreciated that the second reference video file used to generate the histogram of FIG. 7 may comprise a copyrighted video.

It is appreciated that in FIG. 7, rather than using a feature of a "recognizable object", by using a derivative property, as it were, a "meta-feature" of the "recognizable object" is used as a basis of comparison. Other meta-features may include an orientation of the recognizable object (i.e. the object's angle relative to a fixed reference point, such as the lower left corner of the frame); relative brightness of the recognizable object; a relative position from the center of the frame of the recognizable object; and so forth. For some meta-features, such as the relative position from the center of the frame, it may be desirable to normalize the meta-feature, so that if the suspect video file has been cropped, the effect of the cropping on the distance will be ameliorated when comparing the suspect video file with the reference video file.

Figure 8:
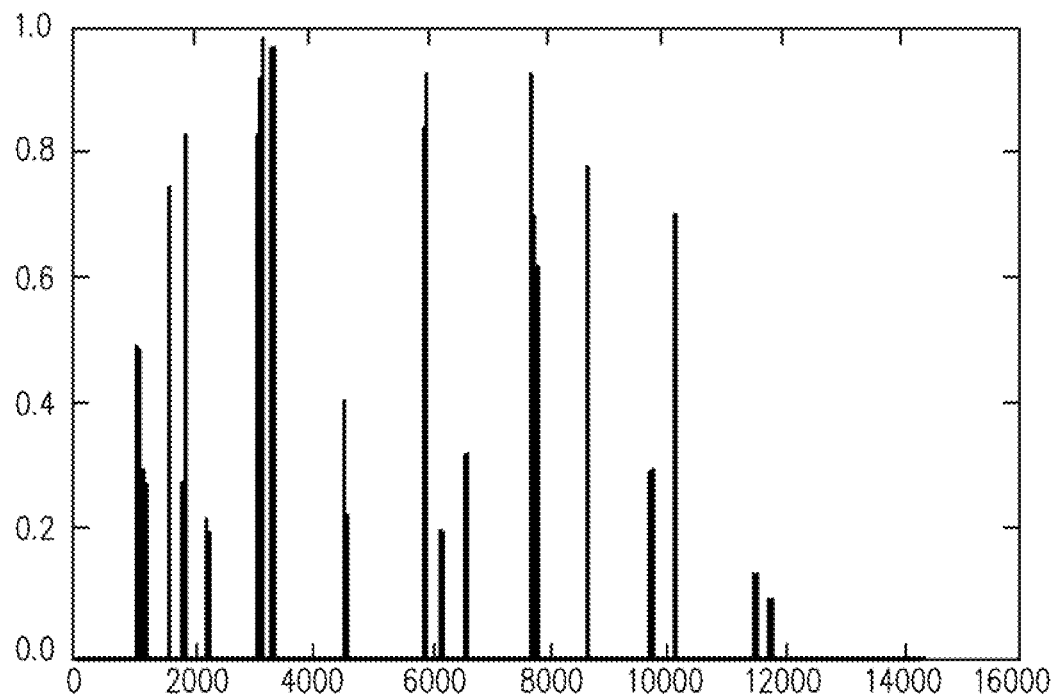
FIG. 8 is a histogram of the vector of a pirated copy (i.e. suspect file) of the second reference video file.

Reference is now made to FIG. 8, which is a histogram of the vector of a pirated copy (i.e. suspect video file) of the second reference video file. The pirated copy of the second reference video file used to generate FIG. 8 is a cropped copy of the second reference video file. Reference is additionally now made to FIG. 9, which is a histogram of the vector of a video file which is not related to the second reference video file.

Figure 9:
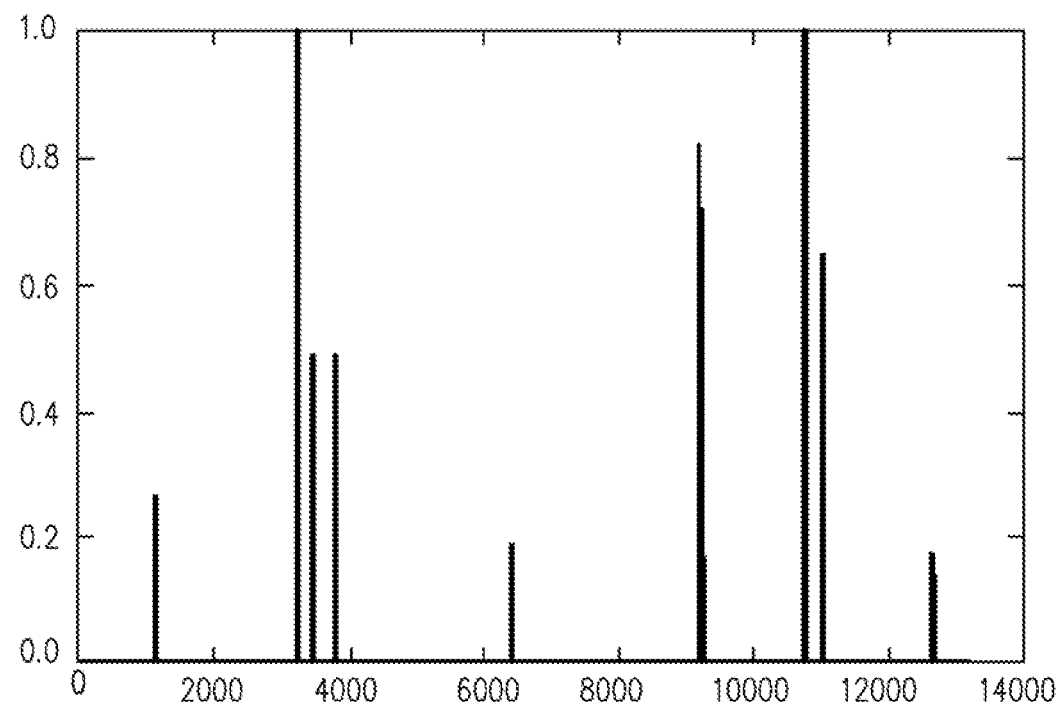
FIG. 9 is a histogram of the vector of a video file which is not related to the second reference video file.

As with the example provided contrasting FIG. 4 with FIGS. 5 and 6, Pearson coefficients were determined for the correlation of the vector of FIG. 7 (i.e. the second reference video file) with the vector of FIG. 8 (i.e. the cropped, pirated version of the second reference video file) and the vector of FIG. 7 (i.e. the second reference video file) with the vector of FIG. 9 (i.e. the unrelated video file).

The Pearson coefficient of the second reference video file versus the cropped, pirated version of the second reference video file was 0.43954015470225877. By contrast, the Pearson coefficient of the second reference video file versus the unrelated video was 0.0013004417195126667. As in the example provided by FIGS. 4-6, the cropped pirated version of the video used to generate the histogram of FIG. 8 is likely to be the same as the second reference video file (which was used to generate FIG. 7). The unrelated video, used to generate the histogram of FIG. 9 shows almost no correlation with the second reference video file It is appreciated that the Pearson coefficient of the second reference video file versus the cropped, pirated version of the second reference video file of 0.43954015470225877 seems "small". However, by comparison to the resulting Pearson coefficient for the unrelated video (i.e., 0.0013004417195126667), the 0.4395 . . . value indicates a much greater level of correlation. As is known in the art, the Pearson formula produces not only correlation coefficient, but also a confidence interval which is the probability that the correlation is not coincidental. Accordingly, a threshold indicating a correlation between suspect video files and the reference video file can be manually or automatically adjusted. Although the above discussion focuses on Pearson coefficients, other methods for determining correlations which are known in the art, such as, but not limited to Spearman's rank correlation coefficient, and Kendall rank correlation coefficient may be used as well.

Figure 10:
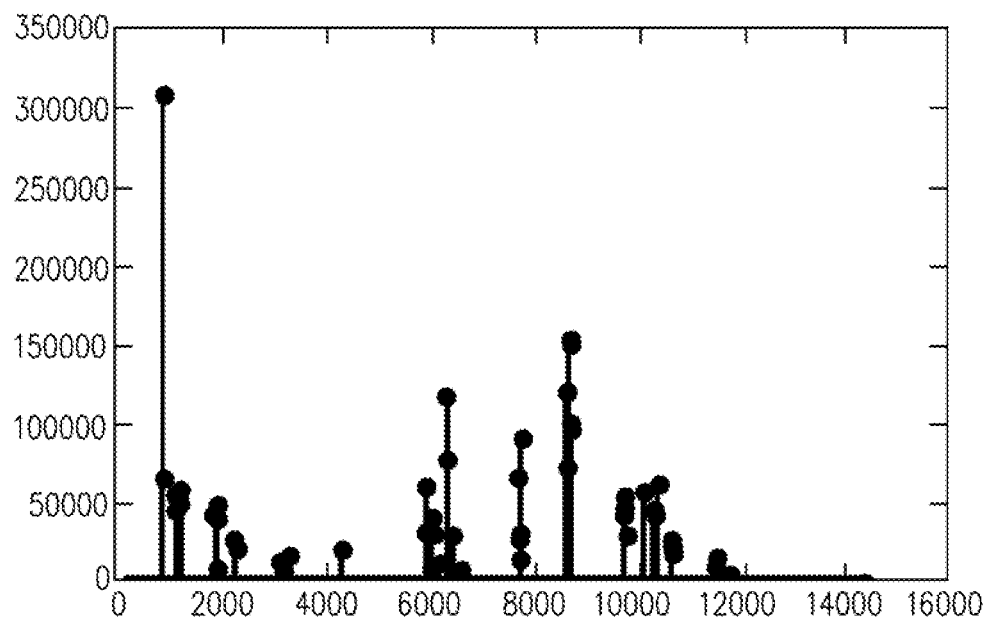
FIG. 10 is a histogram of the vector for a third reference video file.

Reference is now made to FIG. 10, which is a histogram of the vector for a third reference video file. In the third example, an average distance between the faces in each frame was used as the reference object. The position of faces in the video used to generate the example was found. The distances between each pair of faces was summed, and the sum was divided by the number of pairs of faces. The histogram of FIG. 10 displays the result of the above calculation as a function of the frame number. It is appreciated that the third reference file video used to generate the histogram of FIG. 10 may comprise a copyrighted video.

Figure 11:
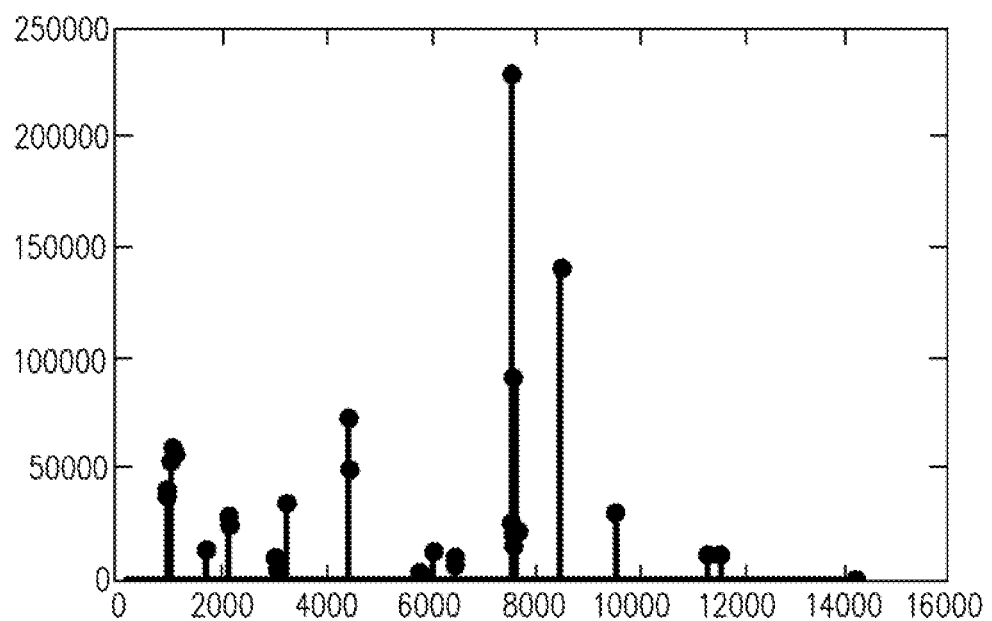
FIG. 11 is a histogram of the vector of a pirated copy (i.e. suspect video file) of the third reference video file.

Reference is now made to FIG. 11, which is a histogram of the vector of a pirated copy (i.e. suspect video file) of the third reference video file. The pirated copy of the third reference video file used to generate FIG. 11 is a cropped copy of the third reference video file. Reference is additionally now made to FIG. 12, which is a histogram of the vector of a video file which is not related to the third reference video file.

Figure 12:
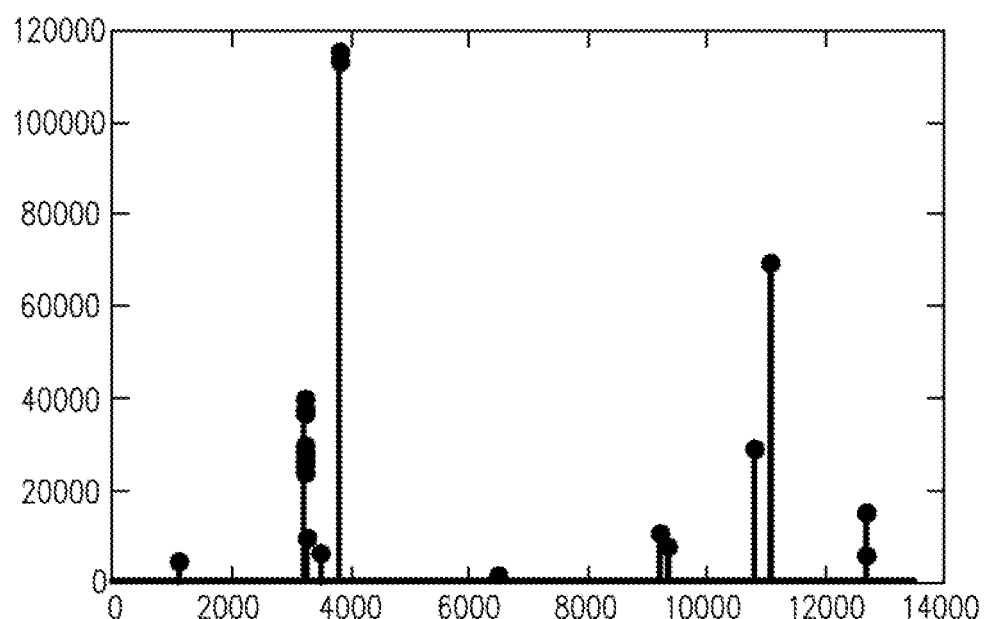
FIG. 12 is a histogram of the vector of a video file which is not related to the third reference video file.

As with the above examples, Pearson coefficients were determined for the correlation of the vector of FIG. 10 (i.e. the third reference video file) with the vector of FIG. 11 (i.e. the cropped, pirated version of the third reference video file) and the vector of FIG. 10 (i.e. the third reference video file) with the vector of FIG. 12 (i.e. the unrelated video file).

The Pearson coefficient of the third reference video file versus the cropped, pirated version of the third reference video file was 0.11072802160715986. By contrast, the Pearson coefficient of the second reference video file versus the unrelated video was −0.0014891778178670973. As in the above prior examples, the cropped pirated version of the video used to generate the histogram of FIG. 11 is more likely to be the same as the third reference video file (which was used to generate FIG. 7). The unrelated video, used to generate the histogram of FIG. 9 shows almost no correlation with the second reference video file. It is appreciated that in the example above, of FIGS. 4, 5, and 6, the case of the comparison of the first reference video file with the unrelated video file resulted in a Pearson coefficient of 0.11813618113119605, which is similar to the Pearson coefficient of the third reference video file versus the cropped, pirated version of the third reference video file, i.e., 0.11072802160715986. However, in judging each of these cases by comparison to their related examples, it can be seen that. In the case of FIGS. 4, 5 and 6, the value of 0.1181 . . . is low, while, in the case of FIGS. 10, 11, and 12, the value of 0.1107 . . . is high. The following table, with Pearson coefficient values truncated to six places, will illustrate this point.

|  | FIGS. 4-6 | FIGS. 7-9 | FIGS. 10-12 |
|---|---|---|---|
| reference video file versus the cropped, pirated copy | 0.661683 . . . | 0.439540 . . . | 0.110728 . . . |
| reference video file versus the unrelated video file | 0.118136 . . . | 0.001300 . . . | −0.001489 . . . |

It is noted that the absolute correlation of this specific feature (i.e. average distance between faces) is not very high, although much higher than the unrelated movie. This may mean that in this specific movie, this feature is not common enough. For example, it may be the case that in the suspect video file the faces are scattered in the frame, as opposed to other video files where the faces are concentrated in the middle of the frame. As such, when cropping the video, a lot of the frames lose some of the faces and distort this feature. It may also be the case that there are not a lot of frames with two or more faces (i.e., this feature returns 0.0 for 0 or 1 faces) and, although in principle, "faces" are may be used as a feature for comparison in general, for this particular suspect video file, a difference feature should be used.

Alternatively, in a case such as the third example, more than one recognizable object may be used to generate multiple vectors for comparison. Repeated positive correlations would be indicative of a match between the reference video file and the suspect video file. It is appreciated that in some cases once a suspect video file is identified as a likely candidate for being a pirated video file, other methods (whether computational or visual) may be performed to confirm the identification.

It is appreciated that for longer video files, it may be desirable to perform the method described above for an excerpt of the reference video file, and then comparing the excerpt of the reference video file with a sliding window of the length of the excerpt of the suspect video file.

The method described herein above may by executed using a general purpose computer which comprises one or more processors. One of the processors may be a special purpose processor operative to perform the content comparison method described herein. Alternatively, the content comparison method described herein may be executed by a general purpose processor running special purpose software for the execution of the content comparison method described herein. The one or more processors typically operate modules, which may be hardware or software for execution of the method described herein. For example, determining may be performed at a determining module, etc.

The following block of pseudocode provides an exemplary routine which might be used for implementing the methods described herein:

```
For each meta_feature in meta_features:
    V1 = list( )
    For each frame in source_video:
        features = Extact_features(frame)
        result = Calculate_meta_features(features)
        V1.append(result)
    V2 = list( )
    For each frame in other_video:
        features = Extact_features(frame)
        result = Calculate_meta_features(features)
        V2.append(result)
    Correlation_coeffiecient, p = Calculate_Correlation(V1, V2)
    If    Correlation_coeffiecient    >
CORRELATION_THRESHOLD: print("match!")
```

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A system comprising:
    a storage device for storing:
        a reference video file comprising a first plurality of frames; and
        a suspect video file comprising a second plurality of frames;
    a processor connected to the storage device, the processor configured to:
        determine, on a per frame basis for the first plurality of frames of the reference video file, a plurality of identifiable recognizable objects which appear in the first plurality of frames of the reference video file;
        select at least one identifiable recognizable object from the plurality of identifiable recognizable objects, wherein the at least one identifiable recognizable object is selected from the plurality of identifiable recognizable objects based on a number of appearances for each of the plurality of identifiable recognizable objects in the first plurality of frames;
        select at least one derivative property of the selected at least one identifiable recognizable object, wherein the at least one derivative property is selected from the following: a size ratio between a biggest instance and a smallest instance of the selected at least one identifiable recognizable object, an orientation of the selected at least one identifiable recognizable object, an angle of the selected at least one identifiable recognizable object relative to a reference point, a brightness of the selected at least one identifiable recognizable object, and a position of the selected at least one identifiable recognizable object from a reference point;
        create a first vector for the reference video file from the selected at least one derivative property of the selected at least one identifiable recognizable object, the first vector being indicative of, on a per frame basis for each of the first plurality of frames of the reference video file, the selected at least one derivative property of the selected at least one identifiable recognizable object in the first plurality of frames of the reference video file;
        determine, on a per frame basis for the second plurality of frames of the suspect video file, an appearance of the selected at least one identifiable recognizable object in the second plurality of frames;
        determine, on a per frame basis for the second plurality of frames of the suspect video file, the selected at least one derivative property of the selected at least one identifiable recognizable object based on the determined appearance in the second plurality of frames of the suspect video file, the second plurality of frames comprising an excerpt comprising a sliding window of length comprising the second plurality of frames of the suspect video file;
        create a second vector for the suspect video file based on determination of the selected at least one derivative property of the selected at least one identifiable recognizable object in the second plurality of frames of the suspect video file;
        calculate a correlation between the first vector and the second vector;
        determine a measure of the correlation between the first vector and the second vector, the measure of the correlation being indicative of a degree of confidence; and
        output a result on the basis of the degree of confidence, the result indicative of a degree of certainty that the suspect video file is a copy of the reference video file.

2. The system according to claim 1, wherein the selected at least one derivative property is normalized.

3. The system according to claim 1, wherein the suspect file has undergone a change of color.

4. The system according to claim 1, wherein the suspect file has undergone at least one of the following: cropping and video format transcoding.

5. The system according to claim 1, wherein the suspect file has undergone at least one of the following: rotation and translation.

6. The system according to claim 1, wherein the suspect file has undergone at least one of the following: audio muting and swapping.

7. The system according to claim 1, wherein the measure of correlation is determined using a statistical method comprising one of the following: a Pearson product-moment correlation coefficient; a Kendall rank correlation coefficient; and a Spearman's rank correlation coefficient.

8. The system of claim 1, wherein the processor is further configured to generate multiple vectors for the reference video file from more than one derivative property of more than one identifiable recognizable objects.

9. The system of claim 1, wherein the processor is further configured to confirm based on the degree of certainty that the suspect video file is the copy of the reference video file, wherein a threshold indicating the correlation between the first vector and the second vector is manually adjusted.

10. A method comprising:
    identifying a recognizable object which appears in a first plurality of frames of a reference video file, the identified recognizable object being predetermined;
    selecting at least one derivative property of the identified recognizable object, the selected at least one derivative property comprising one of the following: a size ratio between a biggest instance and a smallest instance of the identified recognizable object, an orientation of the identified recognizable object, an angle of the identified recognizable object relative to a reference point, a brightness of the identified recognizable object, and a position of the identified recognizable object from a reference point;
        creating a first vector for the reference video file from the selected at least one derivative property of the identified recognizable object, the first vector being indicative of the selected at least one derivative property of the identified recognizable object in the first plurality of frames of the reference video file;

determining, on a per frame basis for a second plurality of frames of a suspect video file, an appearance of the identified recognizable object in the second plurality of frames;

determining, on a per frame basis for the second plurality of frames of the suspect video file, the selected at least one derivative property of the identified recognizable object based on the determined appearance of the identified recognizable object in the second plurality of frames of the suspect video file, the second plurality of frames comprising an excerpt comprising a sliding window of length comprising the second plurality of frames of the suspect video file;

creating a second vector for the suspect video file based on the determination of the selected at least one derivative property of the identified recognizable object in the second plurality of frames of the suspect video file; and calculating a correlation between the first vector and the second vector, the correlation between the first vector and the second vector being indicative of a degree of confidence that the suspect video file is a copy of the reference video file.

11. The method according to claim 10, wherein the selected at least one derivative property is normalized.

12. The method according to claim 10 wherein the suspect file has undergone at least one of the following: a change of color; cropping;
rotation; translation; audio muting; swapping; and video format transcoding.

13. The method according to claim 10, wherein the correlation is determined using a statistical method comprising one of the following: a Pearson product-moment correlation coefficient; a Kendall rank correlation coefficient; and a Spearman's rank correlation coefficient.

14. The method of claim 10, further comprising confirming based on the degree of certainty that the suspect video file is the copy of the reference video file, wherein a threshold indicating the correlation between the first vector and the second vector is manually adjusted.

15. A non-transitory computer-readable medium comprising instructions which when executed perform a method comprising:

identifying a recognizable object which appears in a first plurality of frames of a reference video file, the identified recognizable object being predetermined;

selecting at least one derivative property of the identified recognizable object, the selected at least one derivative property comprising at least one of the following: a size ratio between a biggest instance and a smallest instance of the identified recognizable object, an orientation of the identified recognizable object, an angle of the identified recognizable object relative to a reference point, a brightness of the identified recognizable object, and a position of the identified recognizable object from a reference point;

creating a first vector for the reference video file from the selected at least one derivative property of the identifiable recognizable object, the first vector being indicative of the selected at least one derivative property of the identified recognizable object in the first plurality of frames of the reference video file;

determining, on a per frame basis for a second plurality of frames of a suspect video file, an appearance of the identified recognizable object in the second plurality of frames;

determining, on a per frame basis for the second plurality of frames of the suspect video file, the selected at least one derivative property of the identified recognizable object based on the determined appearance of the identified recognizable object in the second plurality of frames of the suspect video file, the second plurality of frames comprising an excerpt comprising a sliding window of length comprising the second plurality of frames of the suspect video file;

creating a second vector for the suspect video file based on determination of the selected at least one derivative property of the identified recognizable object in the second plurality of frames of the suspect video file;

calculating a correlation between the first vector and the second vector; and determining a measure of the correlation between the first vector and the second vector, being indicative of a degree of confidence that the suspect video file is a copy of the reference video file.

16. The non-transitory computer readable medium of claim 15, wherein the selected at least one derivative property is normalized.

17. The non-transitory computer readable medium of claim 15, wherein the suspect file has undergone at least one of the following: a change of color; cropping; rotation; translation; audio muting; swapping; and video format transcoding.

18. The non-transitory computer readable medium of claim 15, wherein the correlation is determined using a statistical method comprising one of the following: a Pearson product-moment correlation coefficient; a Kendall rank correlation coefficient; and a Spearman's rank correlation coefficient.

19. The non-transitory computer readable medium of claim 15, further comprising confirming based on the degree of certainty that the suspect video file is the copy of the reference video file.

20. The non-transitory computer readable medium of claim 15, wherein a threshold indicating the correlation between the first vector and the second vector is manually adjusted.

* * * * *